Feb. 19, 1957
H. SHOWELL
2,781,631
EXPANSIBLE BRACELET WITH DETACHABLE END
CONNECTIONS AND A LATCH THEREFOR
Filed Nov. 25, 1955
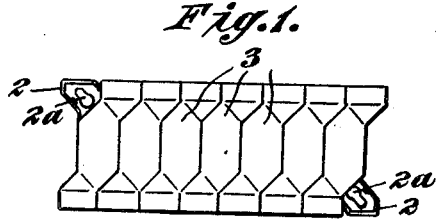
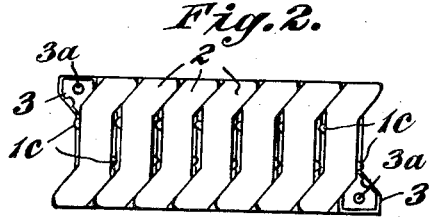
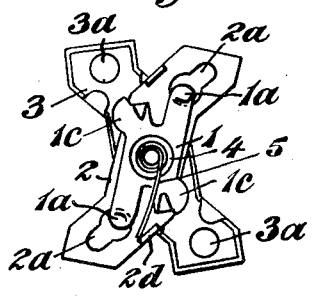 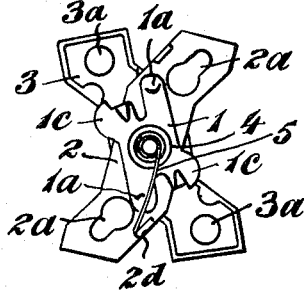
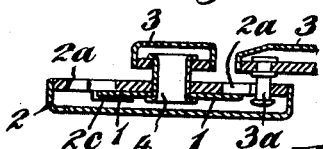 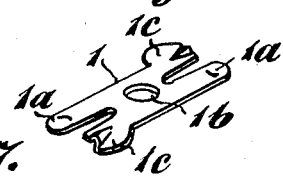
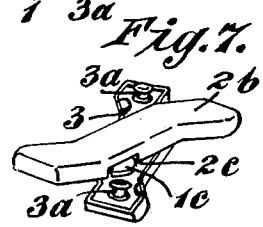
INVENTOR
HENRY SHOWELL
By Miles J. Gillam
HIS ATTORNEY

United States Patent Office 2,781,631
Patented Feb. 19, 1957

2,781,631

EXPANSIBLE BRACELET WITH DETACHABLE END CONNECTIONS AND A LATCH THEREFOR

Henry Showell, Handsworth, Birmingham, England, assignor to Henry Showell Limited, Birmingham, England, a British company Application November 25, 1955, Serial No. 549,138

5 Claims. (Cl. 59—79)

This invention has reference to improvements connected with expansible spring bracelets or the like, and particularly relates to that type of spring bracelet or the like which is composed of a series of spring-urged link units which normally tend to close under the action of the springs embodied in the link units, and in which the connection obtaining between the one part of a link and the associated part of an adjacent link takes the form of a headed pin adapted for location in a key-hole slot.

The object of the invention is to provide a means of partially closing or shuttering a part of the area of the key-hole slot to prevent accidental displacement or uncoupling of the links of the bracelet or the like.

The invention consists of an expansible bracelet or the like of the kind herein referred to, and is characterised by the incorporation as a part of each spring controlled link unit of a pivotally mounted shutter plate adapted to cover part of the area of the key-hole slot in the link unit, said shutter plate being adapted to be manually turned angularly in relation to the said slotted link unit on which it is mounted to cover or uncover part of the area of the said slot for the purpose herein set forth.

A preferred means for carrying the invention into practice will now be described with reference to the accompanying drawings in which:

Fig. 1 is a front view of a series of associated spring controlled link units forming part of an expansible bracelet.

Fig. 2 is a rear view of the associated link units seen in Fig. 1.

Fig. 3 is a rear view of one of the link units seen in Fig. 2 the back cover plate whereof is removed to expose the shutter plate incorporated therein.

Fig. 4 is a further view of the link unit seen in Fig. 3, the shutter plate being shown in an alternative or disengaged position.

Fig. 5 is a section through the link unit seen in Fig. 3 the spring being omitted for clarity.

Fig. 6 is a perspective view of the shutter plate, and

Fig. 7 is a perspective view of one of the link units of the expansible bracelet.

The expansible bracelet is of the kind hereinbefore referred to and generally comprises a series of interconnected spring link units as seen in Figs. 1 and 2. Each link unit consists of a pair of crossed links 2 and 3 which are pivotally associated by means of a tubular rivet 4 and one link 2 is formed with a pair of key-hole slots 2$^a$ and the other link 3 is provided with a pair of headed pins 3$^a$ which pins are adapted to be removably accommodated within the key-hole slots incorporated in the adjacent link units. The associated links of each link unit are urged towards a parallel relative position by means of a coiled spring 5 accommodated within the tubular rivet 4, the ends of the spring being held captive by lugs 2$^d$ formed in the links. A shutter plate 1 is pivotally associated with the slotted link 2 of each of the link units, the shutter plate being apertured at 1$^b$ and thereby retained beneath the flanged extremity of the tubular rivet 4. Each end of the shutter plate is provided with an integral projection or tongue 1$^a$ which is adapted to cover part of the adjacent enlarged end of the key-hole slot 2$^a$. The shutter plate is further formed with a pair of cranked finger pieces 1$^c$ on either side of the plate which serve to assist in the angular setting of the plate relative to the slotted link 2 on which it is pivotally mounted. Normally the shutter plate occupies a position within the spring link unit in which the projections or tongues 1$^a$ provided at each end of the shutter plate engage within or over the large end of the key-hole slot 2$^a$, thus accidental displacement or disconnection of one link unit from its adjacent link unit in the bracelet structure is prevented in that the head of the pin 3$^a$ cannot be moved longitudinally within the key-hole slot in such a way as to disengage the head from within the slot when the shutter plate is in the aforesaid position.

When it is desired to effect a disconnection of one link unit from another the shutter plate is turned through a permitted limited angle relative to the link unit in which it is incorporated so as to clear the enlarged part of the key-hole slot and thus admit of a longitudinal motion of the headed pin to provide for a disconnection or uncoupling of adjacent link units.

The longitudinal side edges of the cover plates 2$^b$ forming part of the link unit on which the shutter plate is pivotally mounted are formed with slots 2$^c$ (as seen in Fig. 7) to admit of the accommodation therein of the finger pieces 1$^c$ of the shutter plate when the plate is in the covered or shuttered position relative to the key-hole slot. The finger pieces 1$^c$ are desirably notched as seen in Fig. 6 to admit of the insertion of a thumb or finger nail into the notch to assist the manipulation and setting of the shutter plate.

I claim:

1. A spring link unit for an expansible bracelet or the like comprising, a pair of crossed links, pivot means for rotatably connecting said links intermediate their ends, a spring for urging said crossed links towards a relatively parallel position, one of said links formed with a keyhole slot adjacent to each of the ends thereof, a headed pin positioned adjacent to each of the ends of the other of said links which headed pins are adapted to be removably accommodated within the keyhole slots of adjacent link units, a shutter plate pivotally mounted on said pivot means, and elements carried by said shutter plate which elements may be adjustably positioned by angular movement of said shutter plate between positions wherein the slots are uncovered and wherein a part of the slots are covered.

2. A spring link unit for an expansible bracelet or the like as defined in claim 1 wherein the pivot means comprises a tubular pivot having a flanged extremity by which the shutter plate is retained in pivotal association with the slotted link of each link unit.

3. A spring link unit for an expansible bracelet or the like as defined in claim 1 wherein the elements carried by the shutter plate comprise integral projections which are adapted to cover part of the adjacently located enlarged areas of the keyhole slots.

4. A spring link unit for an expansible bracelet or the like as defined in claim 1 wherein the shutter plate is provided with a finger engaging portion which facilitates the manual movement of the shutter plate.

5. A spring link unit for an expansible bracelet or the like comprising, a pair of crossed links, pivot means for rotatably connecting said links intermediate their ends, a spring for urging said crossed links towards a relatively parallel position, one of said links formed with a keyhole slot adjacent to each of the ends thereof, a plate provided with a longitudinal side edge positioned in covering relation to said one link, a slot formed in said side edge, a headed pin positioned adjacent to each of the ends of the other of said links which headed pins are adapted to be removably accommodated within the keyhole slots of adjacent link units, a shutter plate pivotally mounted on said pivot means, elements carried by said shutter plate which elements may be adjustably positioned by angular movement of said shutter plate between positions wherein the slots are uncovered and wherein a part of the slots are covered, and a finger engaging portion formed on said shutter plate and extending through said slot formed in the side edge of said cover plate by which the shutter plate may be angularly moved to effect coupling and uncoupling of the adjacent link units.

References Cited in the file of this patent

UNITED STATES PATENTS

| | | |
|---|---|---|
| 2,172,525 | Surrows | Sept. 12, 1939 |
| 2,249,086 | MacIntosh | July 15, 1941 |